US006484223B1

(12) United States Patent
Lenz (10) Patent No.: US 6,484,223 B1
(45) Date of Patent: Nov. 19, 2002

(54) TRANSMITTING DEVICE AND BUS SYSTEM FOR DATA TRANSFER

(75) Inventor: Michael Lenz, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/313,894

(22) Filed: May 18, 1999

(30) Foreign Application Priority Data

May 18, 1998 (DE) .......................... 198 22 259

(51) Int. Cl.[7] .......................... G06F 13/14; H02H 3/22; H03D 7/00; G01R 19/00
(52) U.S. Cl. .......................... 710/305; 361/111; 327/50; 327/58
(58) Field of Search ................ 361/119, 111; 327/50–58; 710/311, 313, 314

(56) References Cited

U.S. PATENT DOCUMENTS

| 3,701,144 A | * 10/1972 | Fineran et al. .............. 341/159 |
| 4,593,206 A | 6/1986 | Neidorff et al. |
| 4,611,101 A | * 9/1986 | Walter et al. ............ 379/29.03 |

FOREIGN PATENT DOCUMENTS

| DE | 3013678 C2 | 8/1982 |
| DE | 69119350 T2 | 4/1992 |
| DE | 19523031 A1 | 12/1996 |
| EP | 0297932 A2 | 1/1989 |

OTHER PUBLICATIONS

"Leistungsgebundene elekromagnetische Störemissionen von Leistungshalbleitertopologien", Frank Klotz et al., Ilmenau, 1997, pp. 29–39.
"CAN Controller Area Network", Wolfhard Lawrenz, Hüthig, pp. 3–10.

* cited by examiner

*Primary Examiner*—Peter Wong
*Assistant Examiner*—Tim Vo
(74) *Attorney, Agent, or Firm*—Laurence A. Greenberg; Werner H. Stemer; Gregory L. Mayback (57) ABSTRACT

The invention relates to a transmitting device and a bus system for the serial data transfer of binary data between at least two communication stations, which are coupled to one another via an individual bus line. The transmitting device of a communication station has a circuit for waveform setting. The circuit for waveform setting generates, from a data signal to be transmitted, an output signal having signal edges which are as far as possible in the form of sinusoidal half-waves. In order to generate the signal edges in the form of sine half-waves, an oscillator, a clock counter and a parallel D/A converter are connected in series one after the other. The output signal at the output of the D/A converter has stepped edges. An optimized output signal having signal edges in the form of sine half-waves can be generated by means of suitable dimensioning of the reference elements of the voltage divider of the D/A converter and also by means of a smoothing filter connected downstream of the D/A converter.

13 Claims, 4 Drawing Sheets

FIG 1

PRIOR ART

TRANSMITTING DEVICE AND BUS SYSTEM FOR DATA TRANSFER

BACKGROUND OF THE INVENTION

FIELD OF THE INVENTION

The invention relates to a transmitting device and a bus system for the serial data transfer of binary data between at least two communication stations, which are coupled to one another via a single bus line.

Such a bus system which is suitable for the serial transfer of binary data may be a CAN bus system (CAN=controller area network), for example. A CAN bus system of this type is described, for example, in German published patent application DE 195 230 31 A1.

A bus system for the transfer of data between different communication stations, coupled to a differential dual-wire bus, by means of push-pull signals is specified in the above document. The physical coupling to the dual-wire bus is effected via a transmitting/receiving device, the so-called transceiver (combined terms "transmitter" and "receiver"), contained in each communication station. The transceiver transmits and receives data via the bus.

The transmitting device of the transceiver circuit can significantly influence the edge form of the signal to be coupled into the bus. If the bus signals on the bus are driven at a sufficiently high frequency, then as the frequency increases, an increase is likewise observed in the electromagnetic radiation. Equally, the frequency spectrum of the electromagnetic radiation is widened if the edge steepness of the bus signals coupled into the bus system increases. However, high electromagnetic radiation and, consequently, low electromagnetic compatibility (EMC) have an interfering effect on other assemblies. It is desirable, therefore, to keep the electromagnetic radiation in a bus system as low as possible.

In order to reduce the electromagnetic radiation in dual-wire or multiple-wire bus systems, such as, for example, the dual-wire CAN bus, the (two) bus cores are twisted together. The electromagnetic radiation is largely compensated for by the twisting of the bus lines (twisted pair).

For cost reasons, it is often more favorable to use a bus system having only a single bus line. Such a bus system is, by way of example, the single-wire CAN bus. On the other hand, such single-wire buses have the disadvantage that the electromagnetic radiation cannot be compensated for by twisting as in the case of two-core or multiple-core bus systems.

In order to reduce the electromagnetic radiation, bus systems of this type are connected up to passive components. However, this measure improves the electromagnetic radiation only inadequately and, moreover, reduces the bandwidth of the bus system.

So-called "slew rate limiter" circuits are known as a further measure for reducing the electromagnetic radiation. These circuits effect simple leveling off of the edges of the square-wave bus signals to form trapezoidal signals. This measure considerably reduces the spectrum of the radiated electromagnetic radiation as compared with the passive measures mentioned above.

In order to obtain a further reduction in the spectral components of the electromagnetic radiation, the corners of the trapezoidal bus signal thus produced can be additionally rounded by the targeted incorporation of resistance-capacitance time constants.

Although a considerable reduction in the electromagnetic radiation is discernible as a result of the above-mentioned measures, a considerable spectrum of undesirable electromagnetic radiation nonetheless remains.

SUMMARY OF THE INVENTION

Taking this prior art as a departure point, the object of the present invention, therefore, is to specify a single-wire bus system of the generic type in which it is possible to obtain a further reduction in the electromagnetic radiation.

With the foregoing and other objects in view there is provided, in accordance with the invention, a transmitting device for a serial data transfer of binary data between a plurality of communication stations connected via a single bus line, comprising:

a circuit for edge form setting having an input receiving a data signal to be transmitted and an output;

the circuit generating an output signal from the data signal received at the input, by approximating respective rising and falling edges of the output signal to a curve profile of a sine function having a rising half-wave and a falling half-wave, and thereby approximating one of the rising and falling edges to the rising sine half-wave and the respective other of the rising and falling edges to the falling sine half-wave.

In accordance with an added feature of the invention, the sine half-waves are derived from a function $(\cos x)^2$, where x designates an angle in radians.

In other words, the object of the invention are attained with the transmitting device that includes the novel circuit for edge form setting. The circuit generates an output signal from a data signal to be transmitted, the rising and falling edges of which output signal are approximated to the curve profile of a sine function and the edges are approximated to the rising sine half-wave and to the falling sine half-wave, respectively.

Such output signals having edges in the form of a sine half-wave have a particularly low harmonic content. In theory, to be precise, they have only the fundamental. In this way, it is advantageously possible to reduce radiation of or irradiation by undesirable electromagnetic radiation to a minimum in a single-wire bus system by providing a circuit for edge form setting according to the invention.

The intention, therefore, is for the edges of the output signals to be transferred via the bus to be approximated to the form of a sinusoidal function. In this case, the rising sine half-wave is respectively simulated for the rising edge and the falling sine half-wave is respectively simulated for the falling edge. In negative logic, a rising edge generates a falling sine half-wave, while a falling edge respectively generates a rising sine half-wave.

In this context, the rising sine half-wave is to be understood as the region of the sinusoidal wave between its minimum and its maximum. The falling sine half-wave, on the other hand, is to be understood as the region of the sinusoidal wave between its maximum and its minimum. The sinusoidal function is to be understood to mean any function derived from a sine function or from a cosine function. It is particularly advantageous if the function $(\cos x)^2$ is chosen as the sinusoidal function.

In accordance with an additional feature of the invention, the circuit for edge form setting includes a clock generator, a counter device connected to the clock generator, and a converter connected to the counter device;

the clock generator generating a clock signal from the data signal to be transmitted, and outputting the clock signal to the counter device;

the counter device generating a counter reading signal in clocked fashion; and the converter generating an analog signal derived from the counter reading signal and having stepped edges.

The clock generator is typically an oscillator and generates a clock signal. The clocked counter device connected downstream, for example an up-down counter, continuously counts the coupled-in clock pulses of the oscillator and feeds a counter reading signal derived from the number of coupled-in clock pulses to the converter connected downstream. The converter, which is usually a digital-to-analog converter (D/A converter), generates, proceeding from the counter reading signal, an analog signal having stepped clock edges. The stepped edges of the analog signal, which can be picked off at the output of the D/A converter, simulate the half-wave of a sinusoidal curve better, the greater the data depth or bit width of the up-down counter or of the D/A converter connected downstream is chosen to be.

In accordance with another feature of the invention, the converter includes a voltage divider with a plurality of reference resistors, and the step height of the individual stepped edges of the analog signal is set by a dimensioning of individual reference resistors of the voltage divider. The stepped clock edges in the analog signal simulate the sinusoidal half-wave as optimally as possible when the individual steps do not have the same step height as far as possible. The optimum setting of the respective step heights and, consequently, the optimization of the sinusoidal half-wave of the clock edges can be set by means of suitable dimensioning of the reference elements of the voltage divider of the D/A converter.

The use of a parallel D/A converter is particularly advantageous in this case. This D/A converter has a voltage divider with a multiplicity of reference resistors, to the inputs of which the respective counter reading of the counter device connected upstream is fed. In this case, the reference resistors should be set such that the output values of the D/A converter correspond to the corresponding discrete value on the sinusoidal half-wave. When dimensioning the reference resistors, it must be ensured, in particular, that as the counter reading advances, the respective step height should progressively increase until the counter reading center point is reached, the counter reading center point corresponding to the point of inflection of the sinusoidal half-wave. From the counter reading center point, the step heights of the analog signal should then correspondingly decrease once more. Consequently, the sinusoidal half-wave can be simulated in a simple manner by way of the dimensioning of the reference resistors.

It would also be possible, of course, to realize the D/A converter in a different manner. As an alternative, although much more complicated in terms of circuitry, a load resistor with switchable, controllable current sources would be conceivable as the D/A converter. The reference elements are then formed by current sources which, for example as controllable transistors, form a diode network. The dimensioning of the reference elements and, consequently, the generation of the optimum step heights in the output signal of the D/A converter could then be effected by way of the W/L ratios of the transistors.

In accordance with a further feature of the invention, there is provided a smoothing filter for smoothing the stepped edges of the analog signal connected on an output side of the converter. The smoothing filter is particularly advantageous and, in the preferred embodiment it is a low-pass filter. The steps in the clock edges of the analog signal can be filtered out by means of suitable dimensioning of the filter elements. What is then produced is a continuous, analog output signal which is optimally approximated to the sinusoidal half-wave.

In accordance with again an added feature of the invention, there is provided an amplifier device with a feedback path for signal amplification of the output signal connected on an output side of the converter, i.e., downstream of the converter in a signal path, specifically downstream of the D/A converter and the smoothing filter. The amplifier device, which is preferably an analog operational amplifier, amplifies the output signal, to be driven on the bus, with a suitable gain. In a special operating mode, the so-called wake-up mode, a so-called wake-up signal can thus be impressed on the bus line. This wake-up signal has a distinctly increased amplitude compared with the normal signal, in accordance with the amplification. This wake-up signal of a master unit wakes up all the network nodes on the bus system which were previously in the so-called sleep mode and then selectively activates them or controls them such that they attain the sleep mode again. In an advantageous manner the average current consumption of a bus system is considerably reduced by means of the wake-up mode, since all, sleeping, network nodes which are not addressed during a bus transfer remain in the current-saving sleep mode.

In accordance with again an additional feature of the invention, there is provided a variable resistor for setting an operating frequency of the clock generator connected upstream of the clock generator. Adjusting the operating frequency of the clock generator or oscillator is particularly advantageous. The variable resistor connected upstream of the clock generator enables the oscillator frequency and, consequently, the average gradient of the clock edge of the output signal to be adapted to the desired data transfer rate. Depending on the dimensioning of the variable resistor, which is usually external, a bus system data transfer rate of greater or lesser magnitude can thus be realized.

For space and cost reasons, it is advantageous if the voltage regulating device and the transmitting/receiving device, assigned thereto, of a communication station are monolithically integrated on a single semiconductor chip. It is typical for these voltage regulator modules and the transmitting/receiving device to be monolithically integrated since the technological requirements made of these modules are very similar. It is particularly advantageous if, furthermore, the microcontroller together with its assigned voltage regulating device and transmitting/receiving device are also monolithically integrated on the same semiconductor chip.

With the above and other objects in view there is also provided, in accordance with the invention, a bus system, comprising:

a plurality of communication stations;

a bus with a single bus line interconnecting the communication stations for serial data transfer of binary data between the communication stations;

at least one of the communication stations including at least one transmitting device according to the foregoing summary of the invention.

The inventive circuit for edge form setting of the signal to be transmitted is typically integrated in a transmitting device of a communication station. This transmitting device according to the invention is particularly advantageous in a bus system for data transfer.

The invention is particularly suitable in the automotive arts, i.e., in so-called CAN on-board electrical systems. In this case, a microprocessor controls the data transfer via the single-wire bus via an internal bus and a so-called CAN module, which contains the corresponding CAN protocol, via the transceiver circuit.

Other features which are considered as characteristic for the invention are set forth in the appended claims.

Although the invention is illustrated and described herein as embodied in a transmitting device and bus system for data transfer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Unless specified otherwise, identical or functionally identical elements and signals are provided with identical reference symbols throughout the figures of the drawing.

DESCRIPTION OF THE PREFERRED EMBODIMENTS

Figure 1:
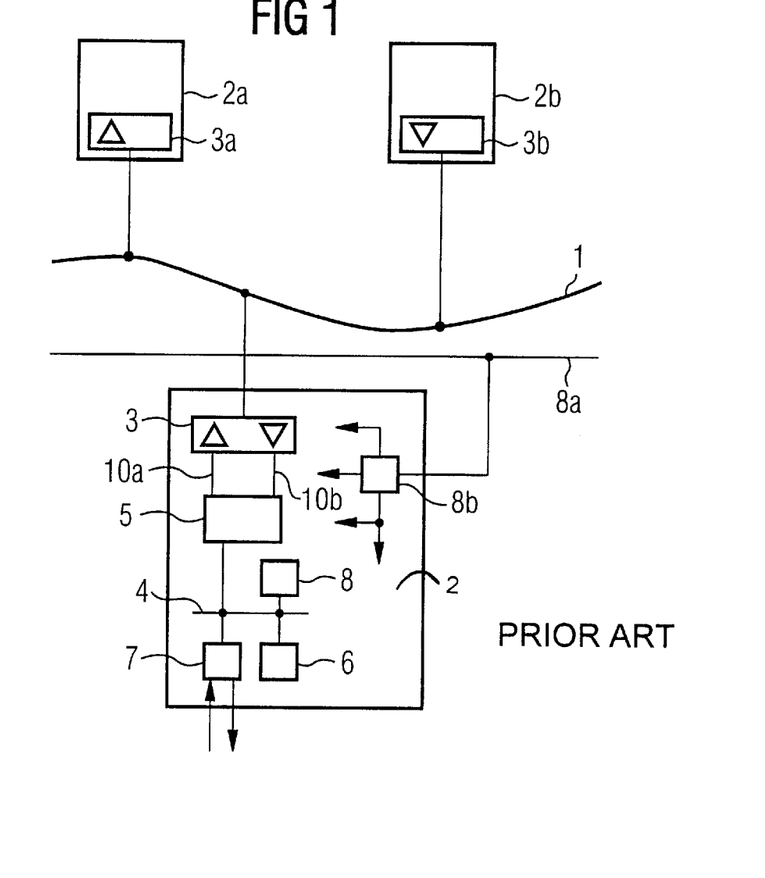
FIG. 1 is a block diagram of a prior art single-wire bus system with a number of communication stations coupled to the bus.

Referring now to the figures of the drawing in detail and first, particularly, to FIG. 1 thereof, there is seen a single-wire bus system for the serial transfer of binary data between communication stations connected to the bus, according to the prior art. In the following text dealing with the preferred embodiments of the invention, the bus system will be presumed to be a so-called CAN bus system (CAN= controller area network). Furthermore, it is assumed that the bus provided is a so-called single-wire bus (SW bus) having a single transmission line.

The configuration of FIG. 1 has (single) bus line 1. The bus system has a multiplicity of communication stations 2, 2a, 2b, which are also referred to as network nodes. The network node 2 comprises a physical transceiver 3. The transceiver 3 or the transmitting/receiving device forms the interface of the network node 2 to the bus 1. Furthermore, the network node 2 has a communications interface 5, which is connected between an internal bus 4 and the transceiver 3 and is connected to the transceiver 3 via a connecting line 10a, 10b. In the present exemplary embodiment, the connecting line 10a is connected to the transmitting device and the connecting line 10b is connected to the receiving device of the transceiver 3. The communication module 5 is often also referred to as a CAN module that controls the data transfer via the bus in accordance with the CAN protocol.

Furthermore, the network node 2 has a microprocessor 6, an I/O device 7 and also a memory unit 8. The various units are each connected to the internal bus 4. It is particularly advantageous, as illustrated in FIG. 1, if the elements 3 to 8 of a network node 2 are monolithically integrated on a single semiconductor chip. This is advantageous in particular for reasons of cost on account of the smaller space requirement.

Furthermore, a voltage supply line 8a for the voltage supply is provided. The voltage supply line 8a is connected to a voltage regulating module 8b typically provided in the communication device 2. Consequently, the voltage regulating module 8b draws its supply voltage via the voltage supply line 8a and provides the feeding voltage for all the above-mentioned modules of the network node 2. Since the requirements of high currents and high voltages have to be fulfilled both by the transceiver 3 and by the voltage regulating module 8b, it is advantageous for these modules, in particular, to be monolithically integrated on a single semiconductor chip.

In the exemplary prior art embodiment of FIG. 1, three network nodes 2, 2a, 2b are connected to the bus 1. In this case, the network node 2, as mentioned above, has a transceiver 3, which is suitable both for transmitting and for receiving data. The associated network node 2 operates as a master-slave unit in this case. The network node 2a on the other hand, has a "transceiver" 3a, which has only a receiving device and, consequently, is suitable exclusively for receiving data (receiver). The associated network node 2a is thus a slave unit. The network node 2b has a "transceiver" 3b, which is designed as a transmitting device and, therefore, is used exclusively for transmitting data (transmitter). The associated network node 2b is thus a master unit.

An above-described CAN bus system which is equipped with two bus lines instead of a single bus line is described in Wolfhard Lawrenz (ed.), CAN—Controller Area Network, Grundlagen und Praxis [CAN—Controller Area Network, Principles and Practical Applications], Hüthig-Verlag, 1997, p.3.

Figure 2:
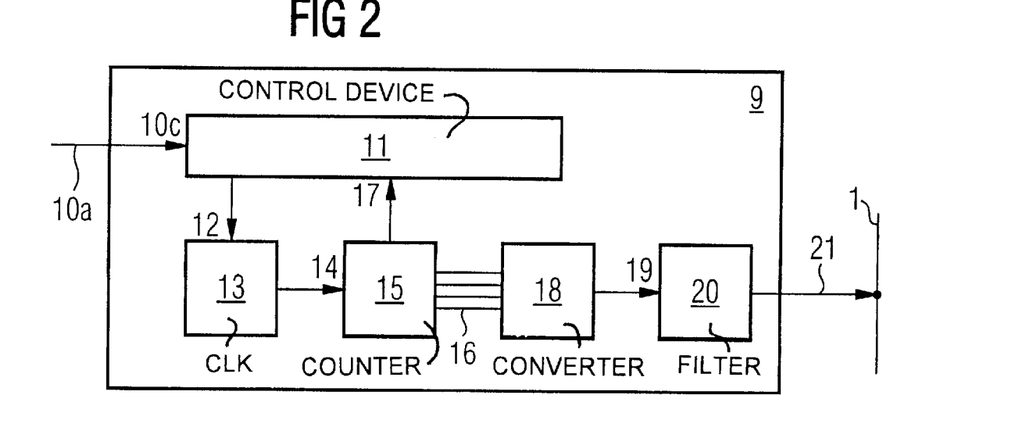
FIG. 2 is a block diagram of a novel circuit for edge form setting for a transmitting device of a single-wire bus system.

FIG. 2 shows the block diagram of an inventive circuit for edge form setting for a transmitting device of a single-wire bus system. To improve the clarity of the description, the block diagram in FIG. 2 only has the elements which are necessary for the transmission of data signals.

In FIG. 2, a circuit for edge form setting is designated by 9. The circuit for edge form setting 9 is in this case connected between the connecting line 10a and the bus 1. A (binary) data signal 10c to be transmitted is coupled into a control device 11 of the circuit 9 via the connecting line 10a. The control device 11 generates a control signal 12, which is coupled into a clock generator 13. The clock generator 13, which is typically an oscillator, generates at its output a clock signal 14, which is fed to a counter device 15 connected downstream. The counter device 15 is a four-bit up-down counter in the present example. The counter device 15 determines a respective counter reading in clocked fashion as a function of the number of coupled-in clock pulses of the clock signal 14, which counter reading can be picked off as counter reading signal 16 at the output of the counter device 15. At the same time, the counter device 15 generates a regulating signal 17, which is fed back into the control device 11.

The counter reading 16 of the counter device 15 is fed to a converter 18 connected downstream. The converter 18 is a digital-to-analog converter (D/A converter) in the present exemplary embodiment. On its output side, the converter 18 generates an analog signal 19 having stepped signal edges. The analog signal is fed to a smoothing filter 20, for example a low-pass filter. The smoothing filter 20 generates an output signal 21 which is optimized with regard to the form of the clock edges and can be coupled into the bus 1 via the output of the circuit 9. In the event of a low bus impedance, an amplifier is necessary as impedance converter between the circuit 9 and the bus 1.

The function of the circuit for edge form setting 9 is explained in more detail below with reference to the pulse-time diagrams in FIG. 3.

Figure 3A:
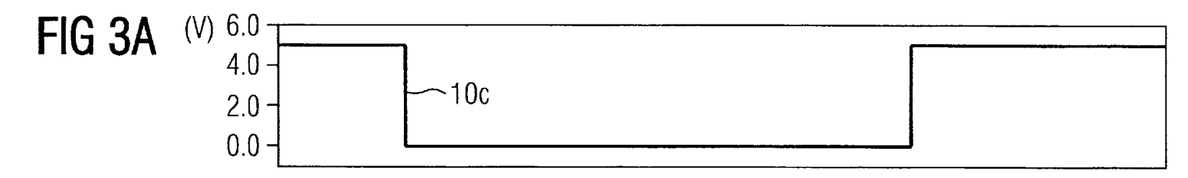
FIG. 3 is a set of graphs showing various pulse-time diagrams for the signals specified in FIG. 2.
Figure 3B:
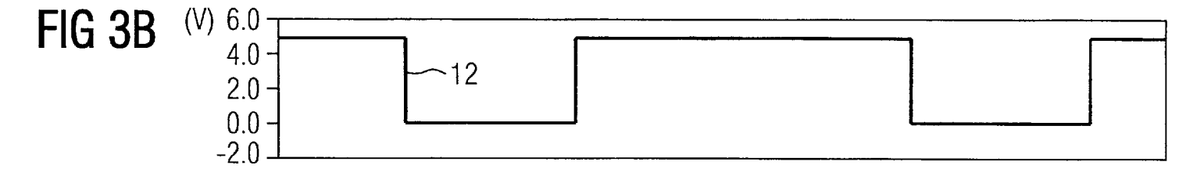
Figure 3C:
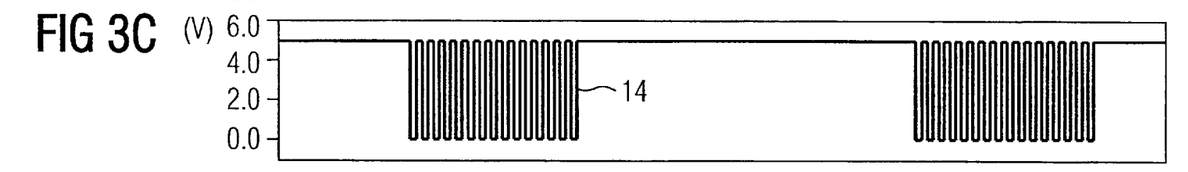
Figure 3D:
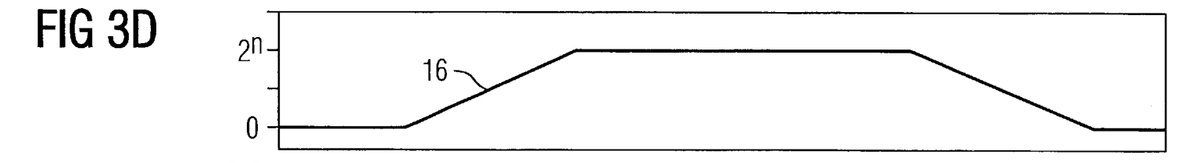
Figure 3E:
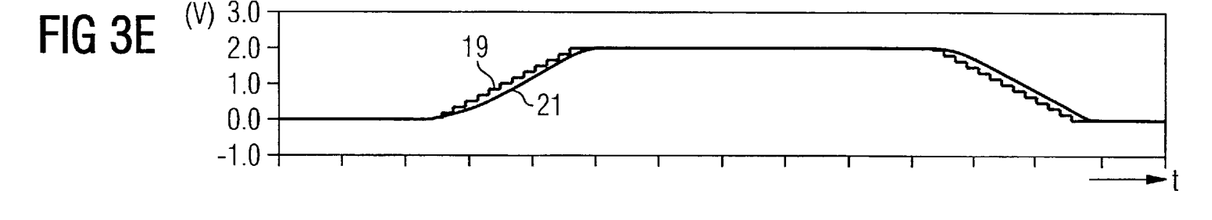

The effect of a negative edge (H-L) of the data signal 10c to be transmitted (FIG. 3(a)) is that the oscillator 13 is started by the control signal 12 (FIG. 3(b)). The clock pulses 14 (FIG. 3(c)) generated by the oscillator 13 on its output side are continuously counted by the up-down counter 15. With its counter reading signal 16 (FIG. 3(d)), the counter 15 causes the D/A converter 18 connected downstream to generate an analog signal 19 having stepped signal edges (FIG. 3(e)), which corresponds to the respective counter position of the counter 15. In order to smooth the steps, the analog signal 19 is fed to a low-pass filter 20 connected downstream. An output signal 21 (FIG. 3(e)) having clock edges in the form of sine half-waves can then be picked off at the output of the smoothing filter 20. Consequently, the output signal 21 corresponds to a potential which is predetermined by the converter 18 and has been additionally smoothed.

After a predetermined number of clock pulses 14, the counter device 15 generates a regulating signal 17, which is fed back into the control device 11. The control device 11 stops the oscillator 13 by way of the control signal 12 (FIG. 3(b)). This number of clock pulses typically corresponds to the number of voltage values which the D/A converter 18 can output. In the case of a 4-bit D/A converter 18, therefore, the oscillator 13 is stopped after a maximum of 16 clock periods. Consequently, the counter device 15 preferably has the same data depth as the digital-to-analog converter 18. After a positive clock edge (L-H) of the signal 10c to be transmitted (FIG. 3(a)), the operation described above proceeds in the reverse direction.

Figure 5:
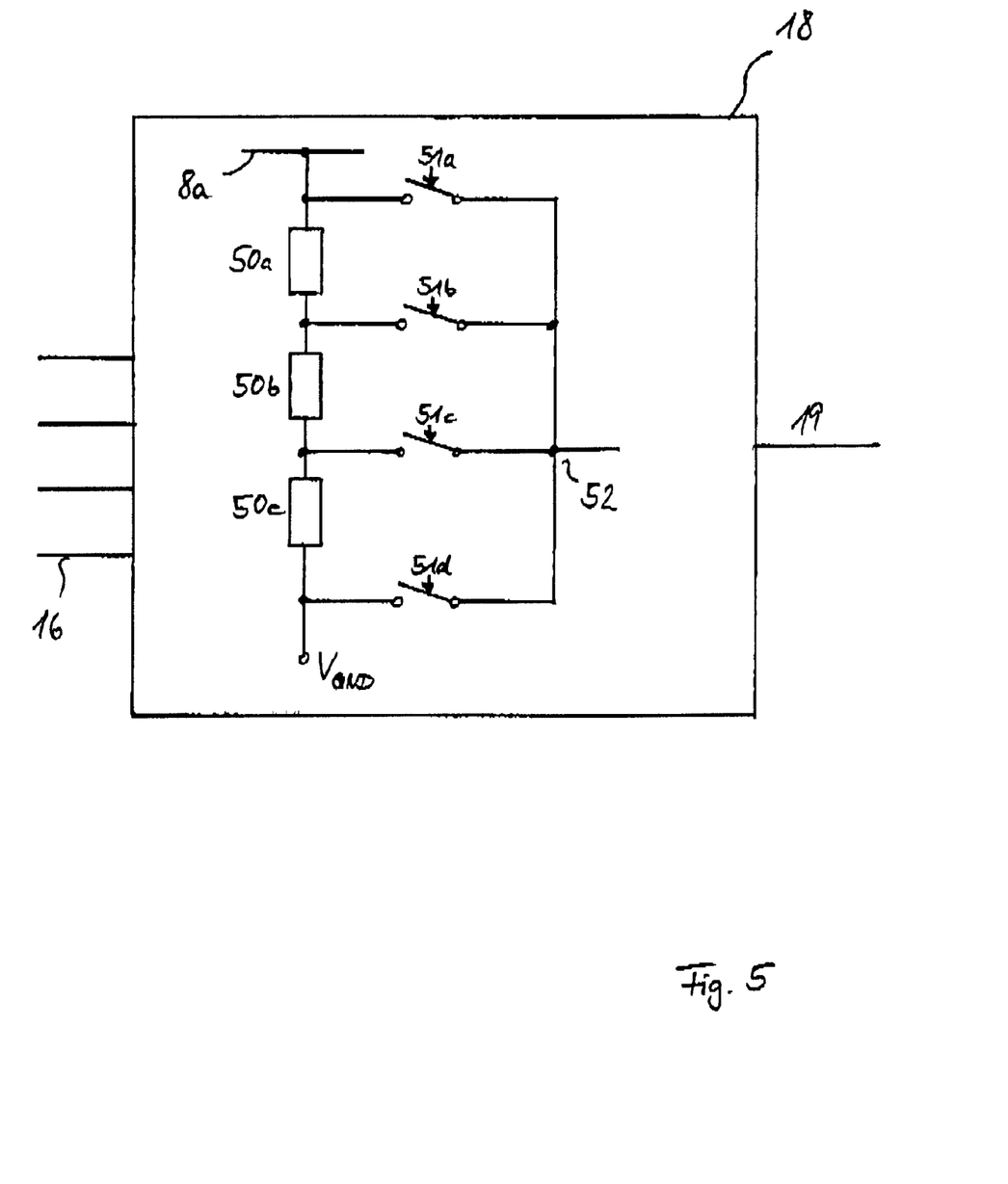
FIG. 5 is a circuit schematic of an exemplary D/A converter used in the circuit of FIG. 2.

With reference to FIG. 5, a D/A converter 18 operating according to the parallel method is advantageously used in this case as the D/A converter 18. In the illustration, the converter 18 includes three resistors 50a to 50c. It is understood, however, that any other number of resistors may be employed. The series circuit of the voltage divider lies between a reference voltage 8a and a reference potential VGND. Four switches 51a to 51d—here controlled switched—are respectively connected with the resistors 50a to 50c, so that an output signal is present at the connection node 52. The desired output voltage becomes available at the node 52 by closing a given one of the switches to which the desired output voltage is assigned.

By means of suitable dimensioning of the voltage divider of the parallel D/A converter 18, the voltage values of the D/A converter 18 are respectively assigned individual converter steps. In other words, the height of the individual steps of the analog signal 19 can be set in a targeted manner in this way with the resistors 50a to 50c (or more). Consequently, the edge form of the output signal 21 can be optimized by means of the suitably set reference resistors of the D/A converter 18, in such a way that these DA signals, which correspond to the form of a sine half-wave and whose edges have the form of a sine half-wave, have a particularly low harmonic content, to be precise theoretically only the fundamental; such output signals 21 in the bus line 1 cause minimal or even no EMC radiation.

Any other D/A converter 18 would also be conceivable, however, as the converter 18. By way of example, the converter 18 could be realized by a load resistor with switchable, controllable current sources. The controllable current sources could in this case be designed as transistors that can be driven via a logic circuit, for example. Such a diode network likewise yields a current having stepped edges but is more complicated in terms of circuitry than the parallel D/A converter described above.

Figure 4:
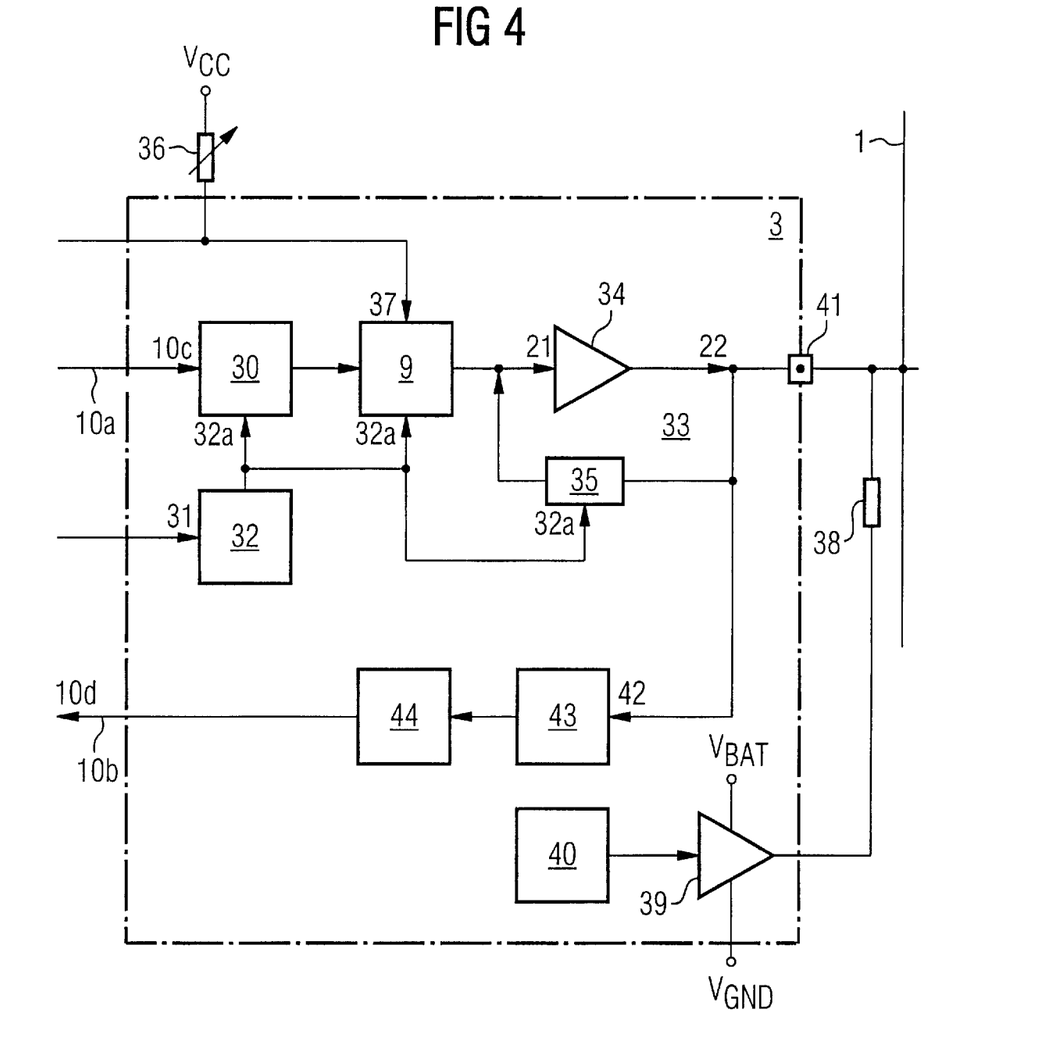
FIG. 4 is a circuit block diagram of a preferred exemplary embodiment of a transceiver circuit for a single-wire bus system, the transceiver circuit including an inventive circuit for edge form setting according to FIG. 2.

FIG. 4 shows a preferred exemplary embodiment of a transceiver circuit for a single-wire bus system, said transceiver circuit having an inventive circuit for edge form setting in accordance with FIG. 2.

In FIG. 4, a time-out circuit 30 is connected upstream of the circuit for edge form setting 9. The data signal 10c to be transmitted is fed to the time-out circuit and the latter drives the circuit 9 connected downstream. In addition, a control logic circuit 32 is provided, to which a first control signal 31 is fed. This is a 2-bit control signal in the present case.

The control logic circuit 32 then generates a second control signal 32a, which is fed to the time-out circuit 30 and also to the circuit 9.

An amplifier device 33 may be additionally connected between the circuit for edge form setting 9 and the bus 1. In the present exemplary embodiment, the amplifier device 33 comprises an analog operational amplifier 34 with a negative feedback path 35. Moreover, the second control signal 32a of the control logic circuit 32 is coupled into the negative feedback path 35. The amplifier device 33 in this case serves to amplify the output signal 21 to be impressed on the bus 1. The amplifier 33 preferably has a fixed voltage gain V, for example V=2, and drives the transmission line of the bus 1 with an amplified output signal 22.

The smoothing filter 20 of the circuit 9 and/or the amplifier 33 connected downstream are/is not absolutely necessary, however, for generating an output signal 21, 22 having edges in the form of sine half-waves. However, the smoothing filter 20 is greatly advantageous, particularly in the case of a D/A converter 18 having a small bit width, since the steps of the edges of the analog signal 19, some of which steps are relatively large, are thereby largely filtered out. The EMC radiation can be considerably reduced in this way.

A further control signal 37 can be coupled into the oscillator 13 of the circuit for edge form setting 9 via a preferably variable resistor 36, which is connected upstream of the oscillator circuit and is connected to an operating potential VCC. By means of this resistor 36, which is typically constructed externally, the operating frequency and, consequently the average gradient of the clock edges of the output signal 21, 22 can be adapted to the desired data transfer rate. Depending on the dimensioning of the variable resistor 36, a bus system data transfer rate of greater or lesser magnitude can thus be achieved.

Furthermore, a line terminating resistor 38 is provided as a load for the amplifying device 33. In the present exemplary embodiment, the line termination is designed as a high-side switch. The reference-ground point or the ground potential VGND of the line terminating resistor 38 is connected in parallel with the bus line 1 via a load reference-ground point driver 39 from the output 41 of the transceiver circuit 3. In the present exemplary embodiment, the load reference-ground point driver 39 is a low-side driver which connects the line terminating resistor 38 to the potential of the reference ground VGND.

In addition, a protection circuit 40 for the load reference-ground point driver 39 is also provided. This protection circuit switches off the load reference-ground point driver 39 in the event of a decrease in the difference between the battery potential and the potential of the reference ground ($V_{BAT}-V_{GND}$). This may occur for example in the event of a short circuit of the feeding voltage $V_{BAT}$ with the reference-ground potential $V_{GND}$ or, for example, if the contact of the network node 2 with the potential of the reference ground $V_{GND}$ is disconnected or acquires a higher impedance (so-called lost off ground). The effect of said switching off is that the bus line 1 can never be influenced, or even blocked, by a raised ground potential $V_{GND}$ in the network.

The transceiver circuit 3 in FIG. 4 also has, in addition to the device for transmitting a data signal 10c, a device for receiving data signals 42 coupled in from the bus 1. Therefore, the output 41 of the transceiver circuit 3 simultaneously serves as an input as well in the case of a single-wire bus system.

Via the output/input 41, a data signal 42 coupled in from the bus 1 is coupled into the transceiver circuit 3 via an input filter 43 and via an amplifier device 44. Consequently, the input filter 43 and amplifying device 44 form the receiving device of the transceiver circuit 3. The filtered and amplified coupled-in binary data signal 10d can be picked off, via the receiving line 10b, by a microprocessor 6 connected downstream.

The different operating modes of the transceiver circuit 3 are described in more detail below with reference to FIG. 4. As already mentioned, the control logic circuit 32 defines the operating mode of the transceiver circuit 3 by means of the control signal 32a. Thus, for example in the case of a 2-bit control signal 31, a maximum of 4 different operating modes can be set. The following operating modes may be provided in this case:

1. Normal Mode

In this mode, the transceiver circuit 3 transmits data signals via the bus at a relatively low transfer rate of, typically, 25 kbit/sec. The circuit for edge form setting 9 is usually activated in this operating mode.

2. High-speed Mode

In this operating mode, data are transferred at a relatively high transfer rate of up to 100 kbit/sec via the bus 1. In order to transfer such high transfer rates, the circuit for edge form setting 9 is typically deactivated.

3. Sleep Mode

If the corresponding transceiver circuit 3 is deactivated in a network node 2, i.e. no data transfer to the bus 1 is provided, then the transceiver circuit 3 is controlled such that it attains the sleep mode. The corresponding network node 2 then has a very low power consumption in the sleep mode.

4. Wake-up Mode

The circuit for edge form setting 9 is activated in the wake-up mode. At the same time, the gain of the output signal 21 is increased by corresponding control of the feedback path 35 of the amplifier device 33. As a result, a so-called wake-up signal is impressed on the bus line 1. This wake-up signal has a considerably increased amplitude compared with the normal signal. The wake-up signal of a master unit "wakes up" all the network nodes 2 on the bus system and then selectively activates them or switches them back to the sleep mode. The average current consumption of a bus system is considerably reduced by means of this wake-up mode, since all the "sleeping" network nodes 2 which are not addressed during a bus transfer remain in the sleep mode. The receiving device 43, 44, 10b consequently forwards a data packet 42, arriving from the bus 1, during the sleep mode to the microcontroller 6 connected downstream only when it has identified the wake-up voltage level, which is distinctly higher than the normal level, for a defined minimum period of time.

If, during the sleep mode, there is a change in the data transfer on the bus line 1, and the change is registered by the receiving device 43, 44, 10b, then the transceiver circuit 3 in the sleep mode or the corresponding network node 2 is woken up again and controlled such that it attains the operating state, that is to say normal mode or high-speed mode, or the wake-up mode.

Furthermore, the time-out circuit 30 can switch off the transceiver circuit 3 in the case where the data signal 10c to be transmitted has not changed for a predetermined time interval, for example a few milliseconds. This is advantageous particularly when, for example, the microprocessor 6 connected upstream permanently sends an active data signal on account of a fault. The bus 1 can then likewise be blocked permanently by the corresponding network node 2, because the dominant level can never be overwritten by other network nodes. As a result, the remaining network nodes 2 connected to the bus 1 can no longer receive or transmit data. The bus 1 is thus blocked. By means of the time-out circuit 30, the corresponding network node 2 is decoupled from the bus 1 by means of a time-out signal after a predetermined period of time in the event of such a fault.

The invention is particularly advantageous in motor vehicle electronics in an on-board electrical system such as, for example, a CAN bus system.

Although the present invention has been described using preferred designs, it should not be regarded as being restricted to these exemplary embodiments. A wide variety of alternatives for other advantageous embodiments and/or modifications will undoubtedly emerge for a person skilled in the art upon consideration of the above description.

I claim:

1. A transmitting device for a serial data transfer of binary data between a plurality of communication stations connected via a single bus line, comprising:

a circuit for edge form setting having an input receiving a data signal to be transmitted and an output;

said circuit generating an output signal from the data signal received at said input, by approximating respective rising and falling edges of the output signal to a curve profile of a sine function having a rising half-wave and a falling halfwave, and thereby approximating one of the rising and falling edges to the rising sine half-wave and the respective other of the rising and falling edges to the falling sine half-wave.

2. The transmitting device according to claim 1, wherein the sine half-waves are derived from a function $(\cos x)^2$, where x designates an angle in radians.

3. The transmitting device according to claim 1, wherein said circuit for edge form setting includes a clock generator, a counter device connected to said clock generator, and a converter connected to said counter device;

said clock generator generating a clock signal from the data signal to be transmitted, and outputting the clock signal to said counter device;

said counter device generating a counter reading signal in clocked fashion; and said converter generating an analog signal derived from the counter reading signal and having stepped edges.

4. The transmitting device according to claim 3, wherein said converter is a parallel D/A converter.

5. The transmitting device according to claim 3, wherein said converter includes a voltage divider with a plurality of reference resistors, and wherein a step height of the stepped edges of the analog signal is set by a dimensioning of individual reference resistors of said voltage divider.

6. The transmitting device according to claim 3, which further comprises a smoothing filter for smoothing the stepped edges of the analog signal connected on an output side of said converter.

7. The transmitting device according to claim 3, which further comprises an amplifier device with a feedback path for signal amplification of the output signal connected on an output side of said converter.

8. The transmitting device according to claim 3, which comprises a variable resistor for setting an operating frequency of said clock generator connected upstream of said clock generator.

9. A bus system, comprising:

a plurality of communication stations;

a bus with a single bus line interconnecting said communication stations for serial data transfer of binary data between said communication stations;

at least one of said communication stations including at least one transmitting device for a serial data transfer of binary data between a plurality of communications connected via said bus, said transmitting device, comprising:

a circuit for edge form setting having an input receiving an data signal to be transmitted and an output;

said circuit generating an output signal from the data signal received at said input, by approximating respective rising and falling edges of the output signal to a curve profile of a sine function having a rising half-wave and a falling half-wave, and thereby approximating one of the rising and falling edges to the rising sine half-wave and the respective other of the rising and falling edges to the falling sine half-wave.

10. The bus system according to claim 9, wherein at least one of said communication stations is respectively assigned at least one transmitting/receiving device for one of transmitting and receiving data signals and at least one voltage regulating device for a voltage supply, and wherein said at least one transmitting/receiving device and said voltage regulating device are monolithically integrated on a single semiconductor chip.

11. The bus system according to claim 9, wherein at least one of said communication stations is respectively assigned at least one transmitting/receiving device for one of transmitting and receiving data signals, at least one microcontroller for controlling the data transfer via the bus line, and at least one voltage regulating device for a voltage supply, and wherein said transmitting/receiving device, said at least one microcontroller, and said at least one voltage regulating device are in each case monolithically integrated on a single semiconductor chip.

12. A controller area network motor vehicle on-board electrical system having at least one bus system for data transfer, said bus system, comprising:

a plurality of communication stations;

a bus with a single bus line interconnecting said communication stations for serial data transfer of binary data between said communication stations;

at least one of said communication stations including at least one transmitting device for a serial data transfer of binary data between a plurality of said communication stations connected via said single bus line, said transmitting device, comprising:

a circuit for edge form setting having an input receiving a data signal to be transmitted and an output;

said circuit generating an output signal from the data signal received at said input, by approximating respective rising and falling edges of the output signal to a curve profile of a sine function having a rising half-wave and a falling half-wave, and thereby approximating one of the rising and falling edges to the rising sine half-wave and the respective other of the rising and falling edges to the falling sine half-wave.

13. A controller area network motor vehicle on-board electrical system having at least one transmitting device for a serial data transfer of binary data between a plurality of communication stations connected via a single bus line, said transmitting device, comprising:

a circuit for edge form setting having an input receiving a data signal to be transmitted and an output;

said circuit generating an output signal from the data signal received at said input, by approximating respective rising and falling edges of the output signal to a curve profile of a sine function having a rising half-wave and a falling half-wave, and thereby approximating one of the rising and falling edges to the rising sine half-wave and the respective other of the rising and falling edges to the falling sine half-wave.

* * * * *